(12) United States Patent
Nishiyabu et al.

(10) Patent No.: US 12,434,787 B2
(45) Date of Patent: Oct. 7, 2025

(54) HYBRID POWER UNIT, HYBRID STRADDLE VEHICLE, AND CASE OF HYBRID POWER UNIT

(71) Applicant: KAWASAKI MOTORS, LTD., Akashi (JP)

(72) Inventors: Masaki Nishiyabu, Akashi (JP); Yuji Hida, Akashi (JP); Tetsuji Yamamoto, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 553 days.

(21) Appl. No.: 17/822,267

(22) Filed: Aug. 25, 2022

(65) Prior Publication Data

US 2023/0063044 A1 Mar. 2, 2023

(30) Foreign Application Priority Data

Sep. 1, 2021 (JP) .................................. 2021-142678

(51) Int. Cl.
*B62M 7/02* (2006.01)
*B62M 23/02* (2010.01)

(52) U.S. Cl.
CPC .............. *B62M 7/02* (2013.01); *B62M 23/02* (2013.01)

(58) Field of Classification Search
CPC ...................................................... B62M 23/02
See application file for complete search history.

(56) References Cited

U.S. PATENT DOCUMENTS

| 6,155,366 | A  | * | 12/2000 | Lin ......................... B60L 50/16 |
| | | | | 180/230 |
| 7,114,585 | B2 | * | 10/2006 | Man ....................... B60K 6/365 |
| | | | | 903/910 |
| 7,819,211 | B2 | * | 10/2010 | Fukami ................... B60K 6/485 |
| | | | | 180/291 |
| 11,002,229 | B2 | * | 5/2021 | Nishiyabu ........ F02M 35/10078 |
| 11,236,813 | B2 | * | 2/2022 | Nishiyabu ........... F16H 57/0436 |
| 11,273,698 | B2 | * | 3/2022 | Nishiyabu .............. F01M 11/02 |
| 11,447,001 | B2 | * | 9/2022 | Nishiyabu .............. B60K 6/387 |
| 2007/0235235 | A1 | | 10/2007 | Fukami et al. |
| 2020/0317293 | A1 | * | 10/2020 | Nishiyabu ................ B60K 6/36 |
| 2021/0001706 | A1 | | 1/2021 | Nishiyabu et al. |

FOREIGN PATENT DOCUMENTS

JP    2007269253 A    10/2007
JP      20218214 A     1/2021

* cited by examiner

*Primary Examiner* — Valentin Neacsu
*Assistant Examiner* — Hosam Shabara
(74) *Attorney, Agent, or Firm* — Alleman Hall & Tuttle LLP (57) ABSTRACT

A hybrid power unit includes: an internal combustion engine; a power transmitting shaft to which power from a crank shaft is transmitted and which is housed in a crank case; an electric motor including a motor driving shaft projecting from a motor housing toward a lateral side, the electric motor being located on an outer surface of the crank case; a linkage which extends through a through hole of the crank case and through which power from the motor driving shaft is transmitted to the power transmitting shaft; and a shaft cover defining a shaft space that houses a portion of the motor driving shaft which projects from the motor housing, the shaft cover being detachably fixed to the outer surface of the crank case so as to cover the through hole.

8 Claims, 9 Drawing Sheets

HYBRID POWER UNIT, HYBRID STRADDLE VEHICLE, AND CASE OF HYBRID POWER UNIT

CROSS-REFERENCE TO RELATED APPLICATION

This application claims priority to and the benefit of Japanese Patent Application No. 2021-142678 filed on Sep. 1, 2021, the entire disclosure of which is incorporated herein by reference.

BACKGROUND OF THE INVENTION

Field of the Invention

The present disclosure relates to a hybrid power unit, a hybrid straddle vehicle including the hybrid power unit, and a case of the hybrid power unit.

Description of the Related Art

Japanese Laid-Open Patent Application Publication No. 2021-8214 discloses a hybrid vehicle including an engine and an electric motor which is located behind a cylinder of the engine and on an upper surface of a crank case. The crank case includes an extension which is located at a lateral side of a motor housing and in which an end portion of a motor driving shaft is.

A projection amount of the extension from a main body of the crank case is large. The extension may interfere with attaching work of other components at the time of assembling, or the degree of freedom of the design of the extension may deteriorate.

SUMMARY OF THE INVENTION

A hybrid power unit according to one aspect of the present disclosure includes: an internal combustion engine including a crank shaft and a crank case that houses the crank shaft and includes a through hole; a power transmitting shaft to which power from the crank shaft is transmitted and which is housed in the crank case; an electric motor including a motor housing and a motor driving shaft projecting from the motor housing toward a lateral side, the electric motor being located on an outer surface of the crank case; a linkage which extends through the through hole and through which power from the motor driving shaft is transmitted to the power transmitting shaft; and a shaft cover defining a shaft space that houses a portion of the motor driving shaft which projects from the motor housing, the shaft cover being detachably fixed to the outer surface of the crank case so as to cover the through hole.

A case of a hybrid power unit according to one aspect of the present disclosure is a case of a hybrid power unit, the hybrid power unit including: an internal combustion engine including a crank shaft; and an electric motor including a motor housing and a motor driving shaft and located on an outer surface of the internal combustion engine, the case including: a crank case that houses the crank shaft and a power transmitting shaft and includes a through hole; and a shaft cover defining a shaft space that houses a portion of the motor driving shaft which projects from the motor housing, the shaft cover being detachably fixed to an outer surface of the crank case so as to cover the through hole.

BRIEF DESCRIPTION OF THE DRAWINGS

FIG. 10A is a perspective view showing a modified example of the cover main body of the shaft cover shown in FIG. 5A.

FIG. 10B is a rear view of the cover main body shown in FIG. 10A.

DESCRIPTION OF THE PREFERRED EMBODIMENTS

Hereinafter, an embodiment will be described with reference to the drawings. Directions stated in the following description are based on directions from the viewpoint of a rider who rides a vehicle. To be specific, a traveling direction of the vehicle is a front direction, and a direction opposite to the traveling direction is a rear direction. A width direction of the vehicle orthogonal to a front-rear direction is a left-right direction.

Figure 1:
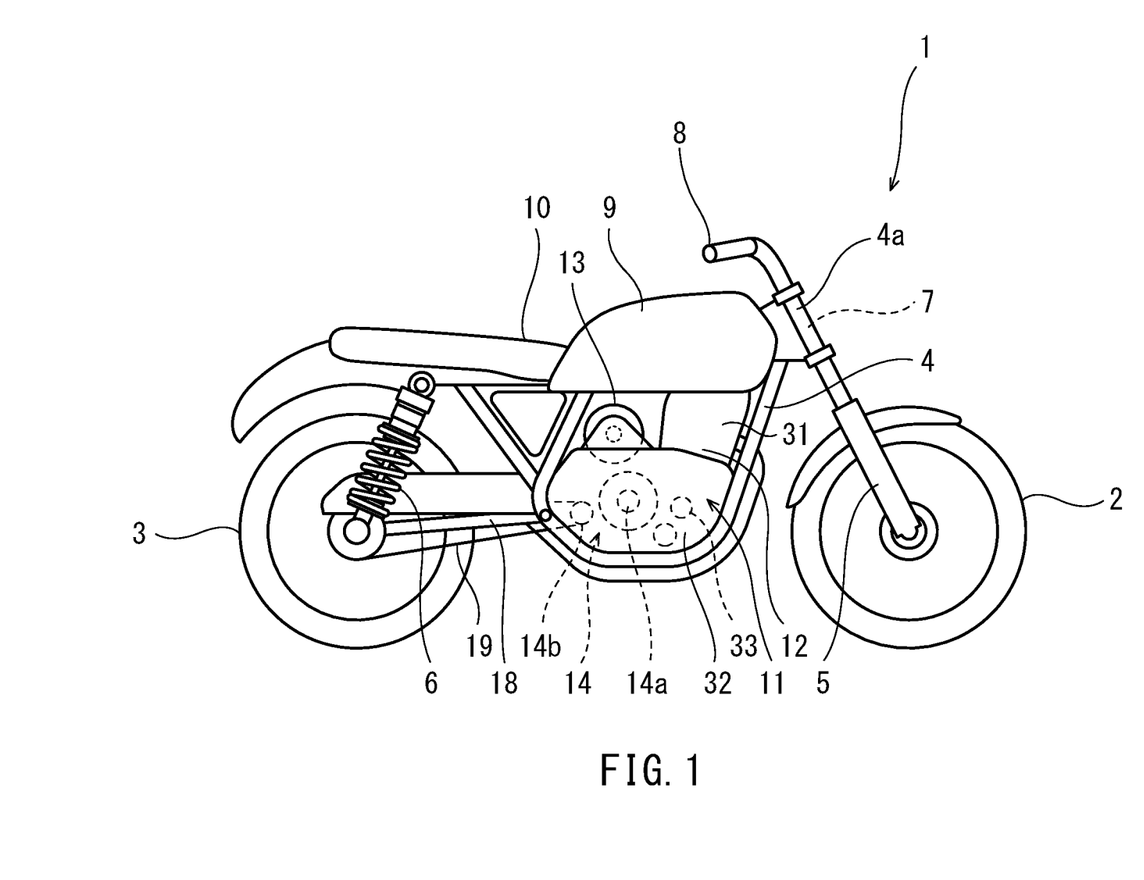
FIG. 1 is a side view of a hybrid straddle vehicle according to an embodiment.

FIG. 1 is a side view of a hybrid straddle vehicle 1 according to the embodiment. As shown in FIG. 1, the vehicle 1 is a motorcycle that is one example of a straddle vehicle straddled by the rider. The vehicle 1 includes a front wheel 2, a rear wheel 3, a vehicle body frame 4, a front suspension 5, and a rear suspension 6. The rear wheel 3 is, for example, a driving wheel. The front suspension 5 connects the front wheel 2 to a front portion of the vehicle body frame 4. The rear suspension 6 connects the rear wheel 3 to a rear portion of the vehicle body frame 4. The front suspension 5 is in connection with a steering shaft 7 through a bracket.

The vehicle body frame 4 includes a head pipe 4a. The steering shaft 7 is in the head pipe 4a so as to be angularly displaceable. A handle 8 grasped with hands of the rider is in connection with the steering shaft 7. A fuel tank 9 is located behind the handle 8. A seat 10 on which the rider is seated is located behind the fuel tank 9. A main frame 4b supports a hybrid power unit 11 located between the front wheel 2 and the rear wheel 3.

The hybrid power unit 11 is a parallel hybrid driving power source. The hybrid power unit 11 includes an internal combustion engine 12 as a prime mover and a motor unit 13 as a prime mover. The internal combustion engine 12 is, for example, a two cylinder engine. The internal combustion engine 12 includes a cylinder 31, a crank case 32, and a crank shaft 33. The cylinder 31 extends upward. The crank case 32 is in connection with a lower end of the cylinder 31 and extends rearward from the cylinder 31. The crank shaft 33 is housed in the crank case 32 and rotates in association with a piston of the cylinder 31. The crank case 32 houses a transmission 14 to which rotational power of the crank shaft 33 is transmitted.

A swing arm 18 that supports the rear wheel 3 and extends in the front-rear direction is supported by the vehicle body frame 4 so as to be angularly displaceable. Rotational power of an output shaft 14b of the transmission 14 is transmitted to the rear wheel 3 through an output transmitting structure 19. The output transmitting structure 19 may be, for example, a chain, a belt, or a drive shaft.

Figure 2:
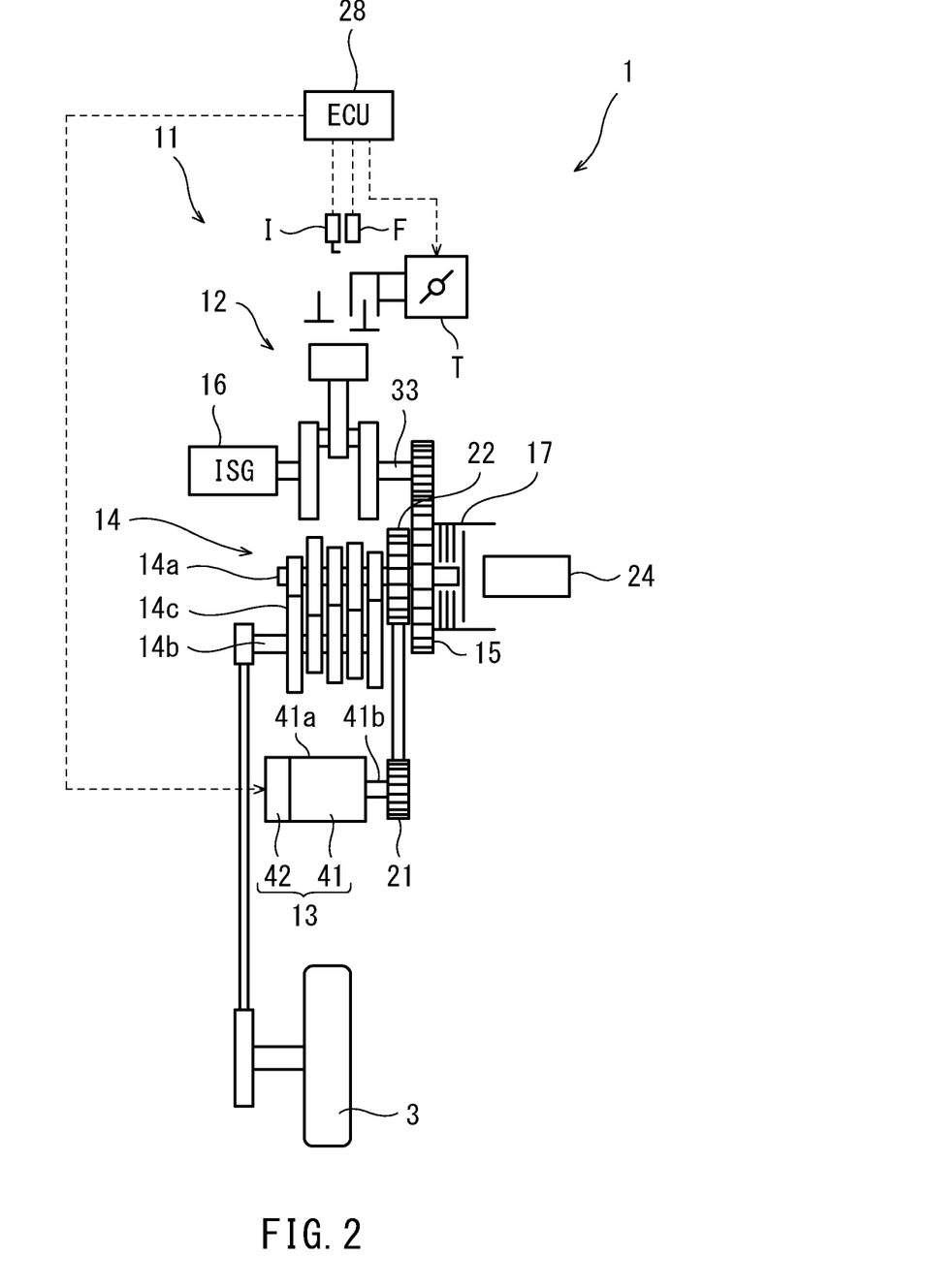
FIG. 2 is a schematic diagram of a power system of the vehicle shown in FIG. 1.

FIG. 2 is a schematic diagram of a power system of the vehicle 1 shown in FIG. 1. As shown in FIG. 2, the transmission 14 includes an input shaft 14a, the output shaft 14b, plural pairs of transmission gears 14c having respective reduction ratios different from each other. The input shaft 14a is one example of a power transmitting shaft to which power is transmitted from the crank shaft 33. The crank shaft 33, the input shaft 14a, and the output shaft 14b extend in the left-right direction of the vehicle 1. In the transmission 14, any one of the plural pairs of transmission gears 14c is selected as a power transmitting path. Power input to the input shaft 14a is transmitted to the output shaft 14b through the selected transmission gears 14c. The transmission 14 is, for example, a dog clutch transmission. One end portion of the crank shaft 33 of the internal combustion engine 12 is in connection with a primary gear 15 so as to be able to transmit power to the primary gear 15. The other end portion of the crank shaft 33 is in connection with a starter generator 16 so as to be able to transmit power to the starter generator 16. A main clutch 17 located coaxially with the input shaft 14a is in connection with one end portion of the input shaft 14a.

The primary gear 15 is located around the input shaft 14a and between the main clutch 17 and the transmission gears 14c in an axial direction of the input shaft 14a. The primary gear 15 is rotatable relative to the input shaft 14a. The primary gear 15 transmits the rotational power from the crank shaft 33 to the main clutch 17. The primary gear 15 is in connection with the input shaft 14a of the transmission 14 through the main clutch 17 so as to be able to transmit power to the input shaft 14a. The main clutch 17 cuts or establishes a power path from the crank shaft 33 to the input shaft 14a.

The motor unit 13 includes an electric motor 41 and an inverter 42. In the present embodiment, the inverter 42 is integrated with the electric motor 41 but may be located away from the electric motor 41. The electric motor 41 includes a motor housing 41a and a motor driving shaft 41b projecting from the motor housing 41a to a lateral side. The motor driving shaft 41b extends in the left-right direction of the vehicle 1. Specifically, the motor driving shaft 41b projects from the motor housing 41a to the right side.

The motor driving shaft 41b is in mechanical connection with the input shaft 14a through a linkage 20 that is a power transmitting structure. The linkage 20 may be, for example, a chain-sprocket structure, a pulley-belt structure, or a gear structure. In the present embodiment, the chain-sprocket structure is described as the linkage 20. A sprocket 21 is located at the motor driving shaft 41b so as to rotate together with the motor driving shaft 41b. A sprocket 22 that rotates together with the input shaft 14a is located around the input shaft 14a and between the primary gear 15 and the transmission gears 14c. The sprocket 21 is in mechanical connection with the sprocket 22 through a chain 23.

A controller 28 is an ECU including a processor and a memory. The controller 28 controls the operations of the internal combustion engine 12 and the main clutch 17. Specifically, the controller 28 controls a throttle T, a fuel injector F, and an ignitor I to control the operation of the internal combustion engine 12. The controller 28 controls the inverter 42 to control the operation of the electric motor 41.

The hybrid power unit 11 includes a clutch actuator 24 that can drive the main clutch 17. The controller 28 controls the clutch actuator 24 such that the clutch actuator 24 operates the main clutch 17 between a connected state and a cut state. The clutch actuator 24 is, for example, a hydraulic actuator including a hydraulic pump that is driven in association with the operation of the internal combustion engine 12, the motor unit 13, or a combination thereof. However, the clutch actuator 24 may be an electric actuator.

Figure 3:
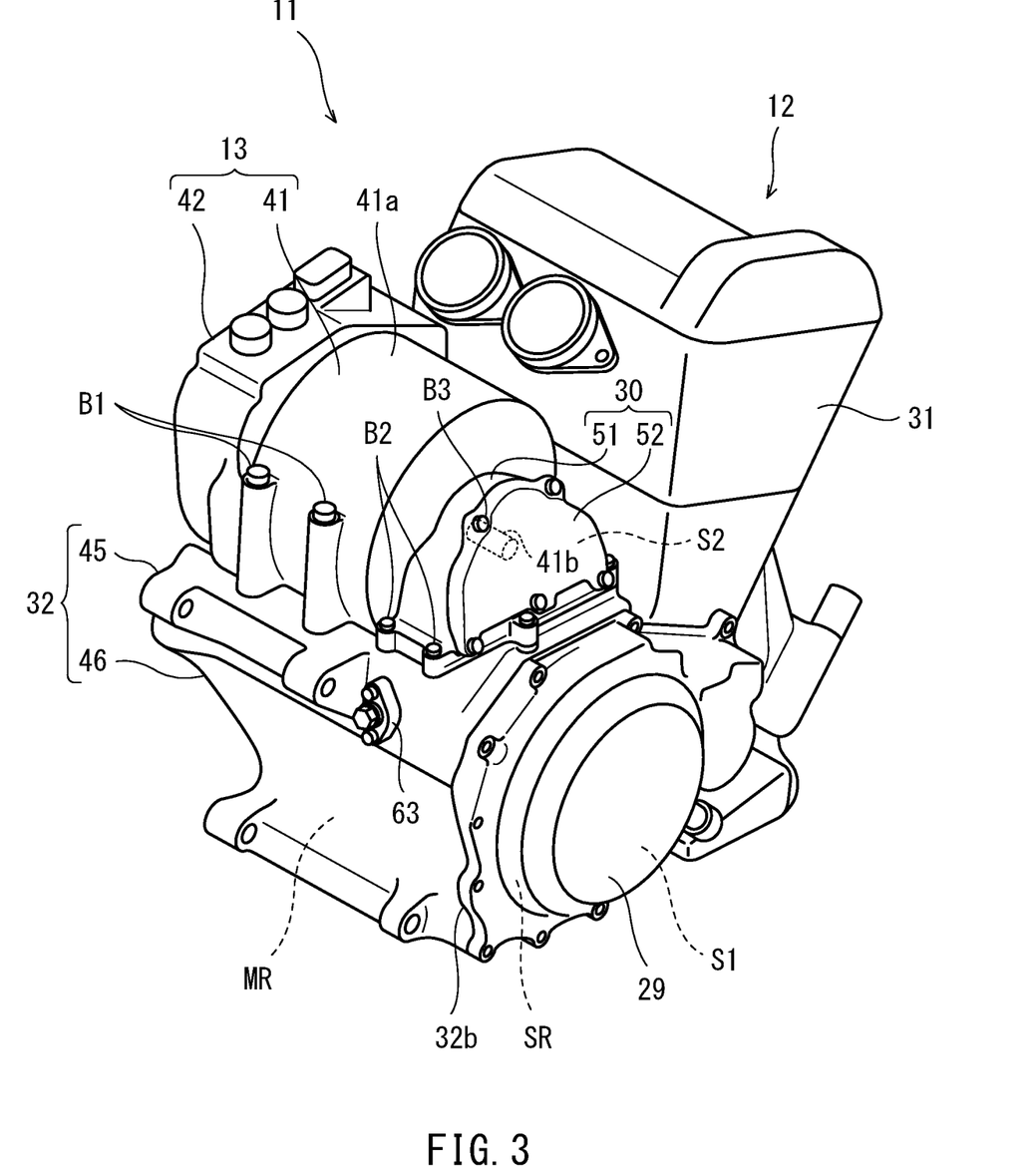
FIG. 3 is a perspective view when viewed from a rear-right side of a hybrid power unit shown in FIG. 1.

FIG. 3 is a perspective view when viewed from a rear-right side of the hybrid power unit 11 shown in FIG. 1. As shown in FIG. 3, the motor unit 13 is located behind the cylinder 31 and at an upper side of the crank case 32 and is mounted on an upper surface of the crank case 32. The motor driving shaft 41b of the electric motor 41 of the motor unit 13 extends to the right side. The inverter 42 is adjacently located at the left side of the electric motor 41. The motor housing 41a has a cylindrical shape having a circular shape when viewed in the left-right direction. The motor housing 41a is fixed to the crank case 32 from the upper side by fasteners B1, such as bolts.

The crank case 32 includes an upper case 45 and a lower case 46 which are stacked on each other in the upper-lower direction. The crank case 32 includes a side wall 32a (see FIG. 7) and a peripheral wall 32b. The side wall 32a defines a main chamber MR that houses the transmission 14. The peripheral wall 32b projects from the side wall 32a toward the right side, i.e., outward in a vehicle width direction. A clutch space 51 surrounded by the peripheral wall 32b is a part of an auxiliary chamber SR and houses the main clutch 17 (see FIG. 2). A clutch cover 29 is detachably fixed to a vehicle width direction outer end surface of the peripheral wall 32b so as to close a space surrounded by the peripheral wall 32b.

A shaft cover 30 is located at the right side of the motor housing 41a so as to cover the motor driving shaft 41b. The shaft cover 30 is detachably fixed to the upper surface of the crank case 32 by fasteners B2, such as bolts. To be specific, the crank case 32 and the shaft cover 30 are included in a case of the hybrid power unit 11. The shaft cover 30 has such a tapered shape that a dimension of the shaft cover 30 in the front-rear direction decreases as the shaft cover 30 extends upward. For example, the shaft cover 30 has a substantially triangular shape in a side view. With this, the shaft cover 30 is reduced in size and weight.

The shaft cover 30 overlaps the electric motor 41 when viewed in the vehicle width direction. The shaft cover 30 is located at an inner side of the clutch cover 29 in the vehicle width direction. The shaft cover 30 is smaller than the clutch cover 29 when viewed in the vehicle width direction. The shaft cover 30 includes a cover main body 51 and a lid 52. The lid 52 is detachably fixed to the cover main body 51 by fasteners B3, such as bolts, from an outside in the vehicle width direction.

The electric motor 41 is located behind the cylinder 31 and above the transmission 14. A tip of the motor driving shaft 41b of the electric motor 41 is located at the inner side of a vehicle width direction side surface (right side surface in FIG. 3) of the cylinder 31 in the vehicle width direction, i.e. at a middle side of the vehicle width direction side surface of the cylinder 31 in the vehicle width direction. With this, the electric motor 41 is prevented from projecting in the vehicle width direction beyond the cylinder 31.

One vehicle width direction side surface (for example, a right side surface) of the motor housing 41a is located at the inner side of one vehicle width direction side surface (for example, the right side surface) of the cylinder 31 in the vehicle width direction, i.e., at the middle side of one vehicle width direction side surface (for example, the right side surface) of the cylinder 31 in the vehicle width direction. The shaft cover 30 is located in a space between one vehicle width direction side surface (for example, the right side surface) of the cylinder 31 and one vehicle width direction side surface (for example, the right side surface) of the motor housing 41a when viewed in the front-rear direction.

Figure 4:
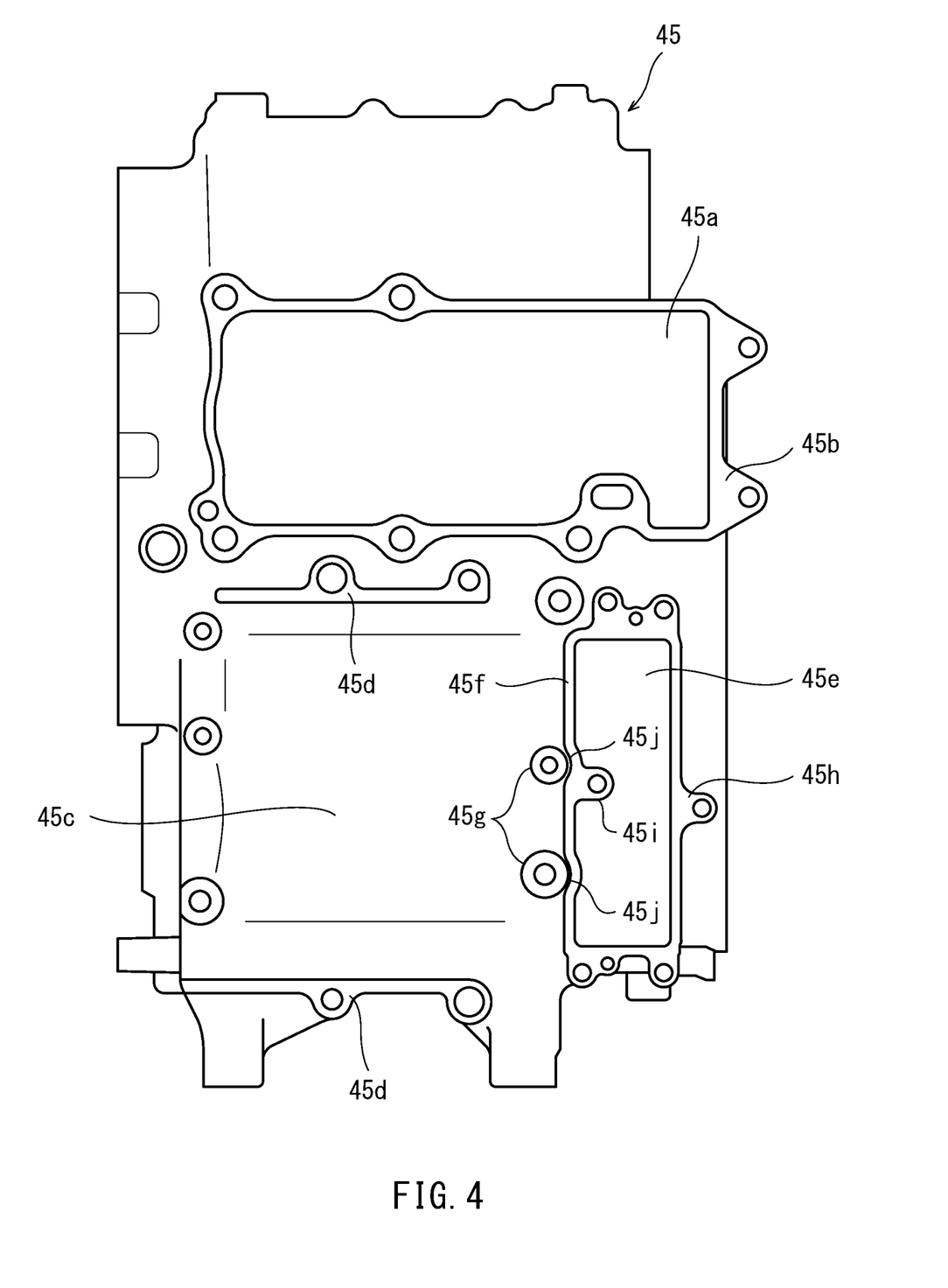
FIG. 4 is a plan view of an upper case of a crank case of the hybrid power unit shown in FIG. 3.

FIG. 4 is a plan view of the upper case 45 of the crank case 32 of the hybrid power unit 11 shown in FIG. 3. As shown in FIG. 4, the upper case 45 includes an opening 45a that is open in the upper-lower direction. A piston space of the cylinder 31 (see FIG. 3) communicates with the main chamber MR (see FIG. 3) of the crank case 32 through the opening 45a. A contact surface 45b on which the cylinder 31 (see FIG. 3) is mounted is located around the opening 45a. The upper case 45 includes a circular-arc recessed surface 45c that is located behind the opening 45a and is recessed downward along an outer peripheral surface of the motor housing 41a (see FIG. 3). The recessed surface 45c houses a lower end portion of the motor housing 41a. The upper case 45 includes motor seat surfaces 45d which are respectively located at front and rear sides of the recessed surface 45c and to which the electric motor 41 (see FIG. 3) is fixed. The lower end of the motor housing 41a is located lower than the motor seat surface 45d by the recessed surface 45c. With this, an upper-lower distance between the upper surface of the crank case 32 and the motor driving shaft 41b can be reduced, and a dimension of the shaft cover 30 in the upper-lower direction is easily reduced.

The upper case 45 includes a through hole 45e that is located at the right side of the recessed surface 45c and is open in the upper-lower direction. A shaft space S2 (see FIG. 5A) defined by the shaft cover 30 (see FIG. 3) communicates with the clutch space S1 (see FIG. 3) through the through hole 45e. A contact surface 45f on which the shaft cover 30 (see FIG. 3) is mounted is located around the through hole 45e. The contact surface 45f that is an attachment surface of the crank case 32 to which the shaft cover 30 is attached is located on a flat plane extending in parallel with an axial direction of the motor driving shaft 41b of the electric motor 41 fixed to the crank case 32. In the present embodiment, the contact surface 45f is inclined downward as it extends away from the cylinder 31 in the rear direction. The attachment surface, i.e., the contact surface 45f is located on the upper surface of the crank case 32. The attachment surface, i.e., the contact surface 45f is located at a portion of the upper surface of the crank case 32 which is located at the lateral side of the portion at which the electric motor 41 is located. The attachment surface, i.e., the contact surface 45f is located behind the cylinder 31. The attachment surface, i.e., the contact surface 45f is located above the main clutch 17.

A pair of fastening seat portions 45g each including a fastening hole are located at a bottom portion of the recessed surface 45c. The fastening seat portions 45g are located lower than the contact surface 45f. In a plan view, the fastening seat portions 45g are adjacent to the contact surface 45f located around the through hole 45e. The contact surface 45f includes recesses 45j which are located at portions of the contact surface 45f adjacent to the fastening seat portions 45g in a plan view and are recessed toward the through hole 45e so as to avoid the fastening seat portions 45g. In a plan view, the fastening seat portions 45g are located at the recesses 45j. To be specific, the fastening seat portions 45g are located so as to be visible when viewed from the upper side of the upper case 45. The crank case 32 includes a fastening seat portion 45h and a fastening seat portion 45i which are located at the contact surface 45f. The fastening seat portion 45h projects in a direction away from the through hole 45e and includes a fastening hole. The fastening seat portion 45i projects in a direction toward the through hole 45e and includes a fastening hole. The fastening seat portion 45i is located adjacent to the fastening seat portions 45g. In a plan view, the fastening seat portion 45i is located inside the cover main body 51. Therefore, the cover main body 51 (see FIG. 3) can be located close to the electric motor 41 (see FIG. 3).

Figure 5A:
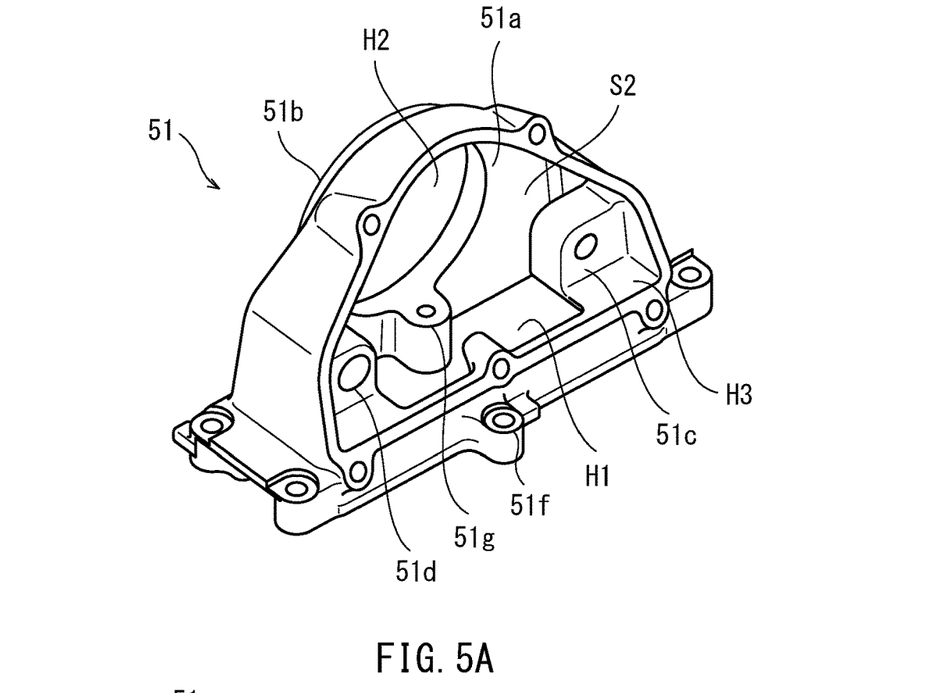
FIG. 5A is a perspective view of a cover main body of a shaft cover shown in FIG. 3.
Figure 5B:
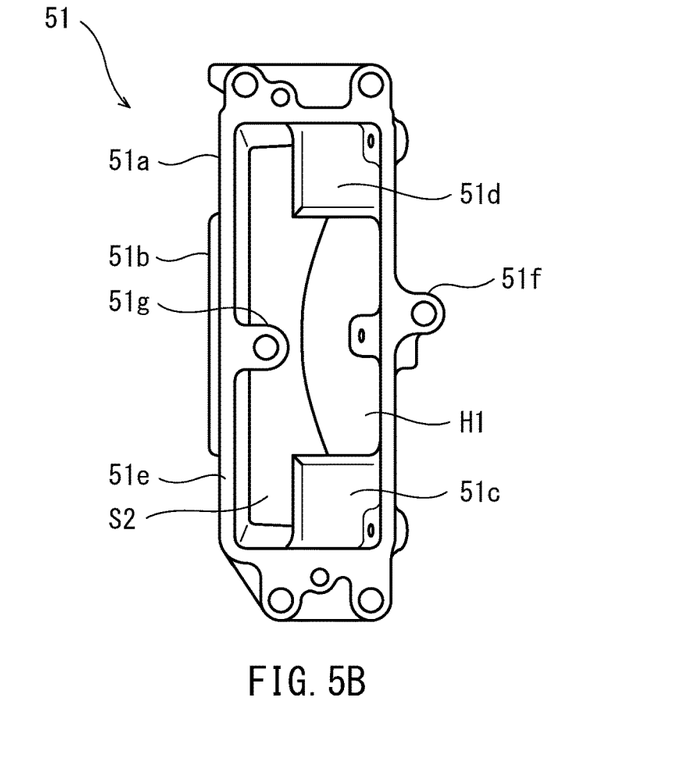
FIG. 5B is a bottom view of the cover main body shown in FIG. 5A.

FIG. 5A is a perspective view of the cover main body 51 of the shaft cover 30 shown in FIG. 3. FIG. 5B is a bottom view of the cover main body 51 shown in FIG. 5A. As shown in FIGS. 5A and 5B, the cover main body 51 of the shaft cover 30 defines the shaft space S2 as an internal space. The cover main body 51 includes a through hole H1, a shaft hole H2, and an opening H3. The shaft space S2 communicates with the through hole 45e (see FIG. 4) of the upper case 45 through the through hole H1. The shaft space S2 is open toward the motor housing 41a (see FIG. 3) through the shaft hole H2. The motor driving shaft 41b (see FIG. 3) is in the shaft space S2 through the shaft hole H2. The shaft space S2 is open outward in the vehicle width direction through the opening H3. The opening H3 is closed by the lid 52 (see FIG. 3). The opening H3 is larger than the sprocket 21 (see FIG. 7). Therefore, the sprocket 21 is easily accessible through the opening H3, and this improves the ease of maintenance.

The cover main body 51 includes a side wall 51a and a fitted tubular portion 51b. The side wall 51a faces the motor housing 41a (see FIG. 3). The fitted tubular portion 51b projects outward from the side wall 51a toward the motor housing 41a (see FIG. 3). The fitted tubular portion 51b defines the shaft hole H2. The cover main body 51 includes a pair of guide supports 51c and 51d facing the shaft space S2. The guide support 51c is a seat portion in which a fastener B5 is. The fastener B5 supports a below-described fixed guide 60 (see FIG. 7). The guide support 51d is a seat portion in which a support pin 62 is. The support pin 62 supports a below-described movable guide 61 (see FIG. 7). The pair of guide supports 51c and 51d are respectively located at front and rear portions of the cover main body 51 and project from an inner surface of the cover main body 51 toward the shaft space S2.

The shaft cover 30 is made of a metal material, and therefore, the rigidity of the guide supports 51c and 51d improves. Since the shaft cover 30 is made of the metal material, the shaft cover 30 is hardly deformed, and the seal performance between the shaft cover 30 and the motor driving shaft 41b is satisfactorily maintained. The material of the shaft cover 30 is not limited to this and may be a resin material.

The cover main body 51 includes a contact surface 51e that is in contact with the contact surface 45f of the upper case 45. The contact surface 51e is located so as to surround the through hole H1. When viewed in a direction orthogonal to the contact surface 51e, the fitted tubular portion 51b projects outward toward the motor housing 41a (see FIG. 3) beyond the contact surface 51e. The cover main body 51 includes a fastening seat portion 51f and a fastening seat portion 51g which are located at the contact surface 51e. The fastening seat portion 51f coincides with the fastening seat portion 45h (see FIG. 4) of the upper case 45 and includes a fastening hole. The fastening seat portion 51g coincides with the fastening seat portion 45i (see FIG. 4) of the upper case 45 and includes a fastening hole. The fastening seat portion 51f projects in a direction away from the through hole H1. The fastening seat portion 51g projects in a direction toward the through hole H1. To be specific, the fastening seat portion 51g projects toward the shaft space S2. The fastening seat portion 51g is located at a front-rear direction intermediate portion of the through hole H1, and therefore, can be prevented from interfering with the chain 23 (see FIG. 7).

Figure 6:
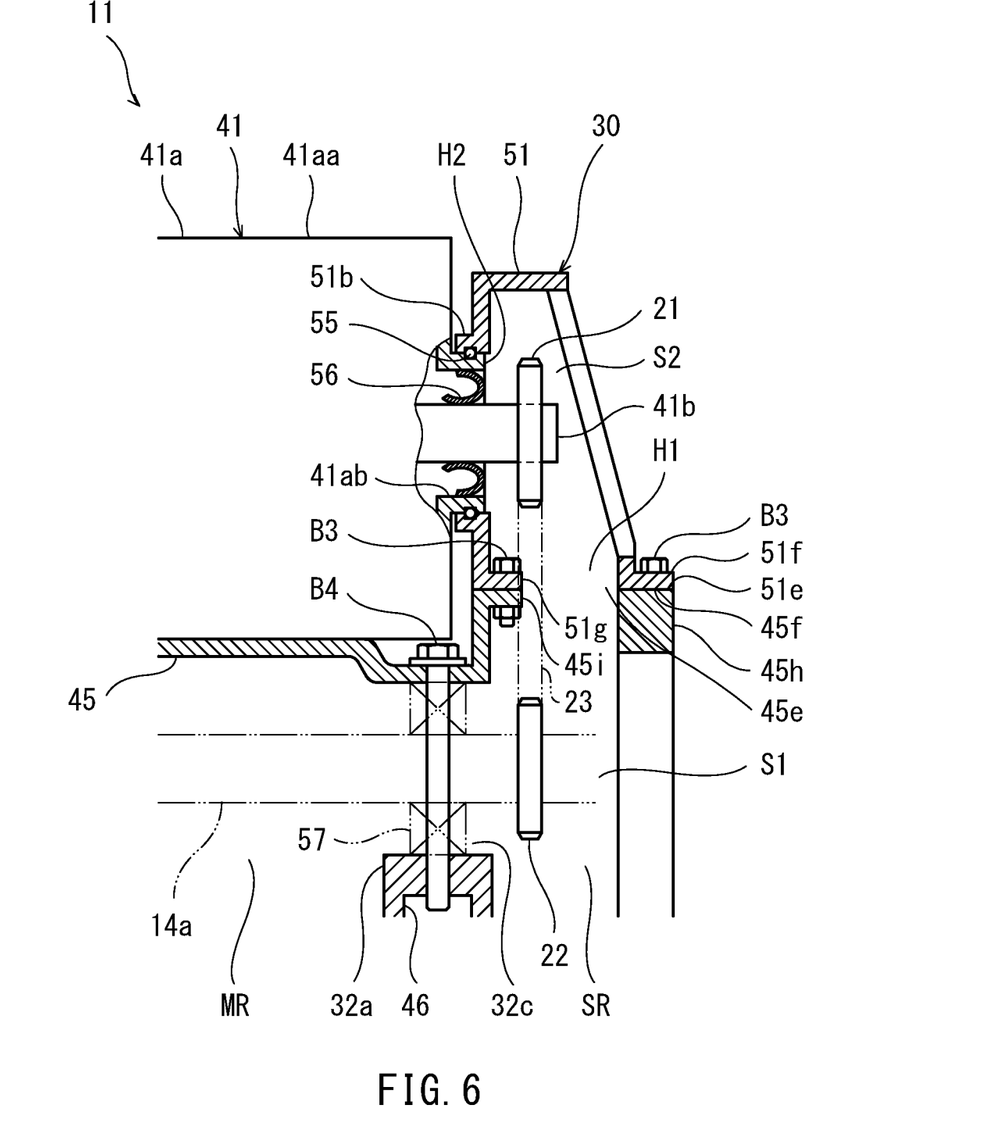
FIG. 6 is a partial sectional view when viewed from a rear side of the hybrid power unit shown in FIG. 3.
Figure 7:
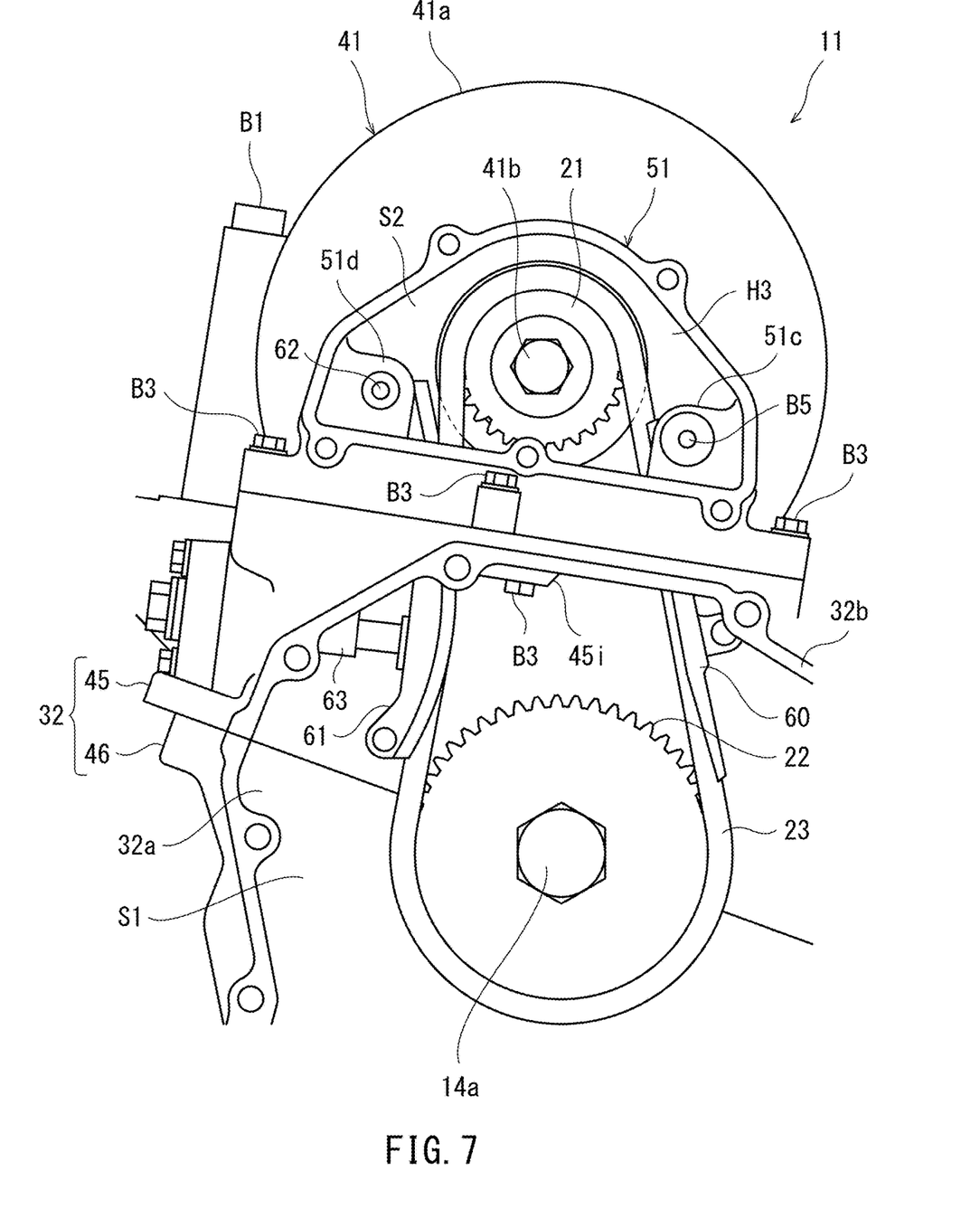
FIG. 7 is a partial right side view showing that a lid of the hybrid power unit shown in FIG. 3 is detached.
Figure 8:
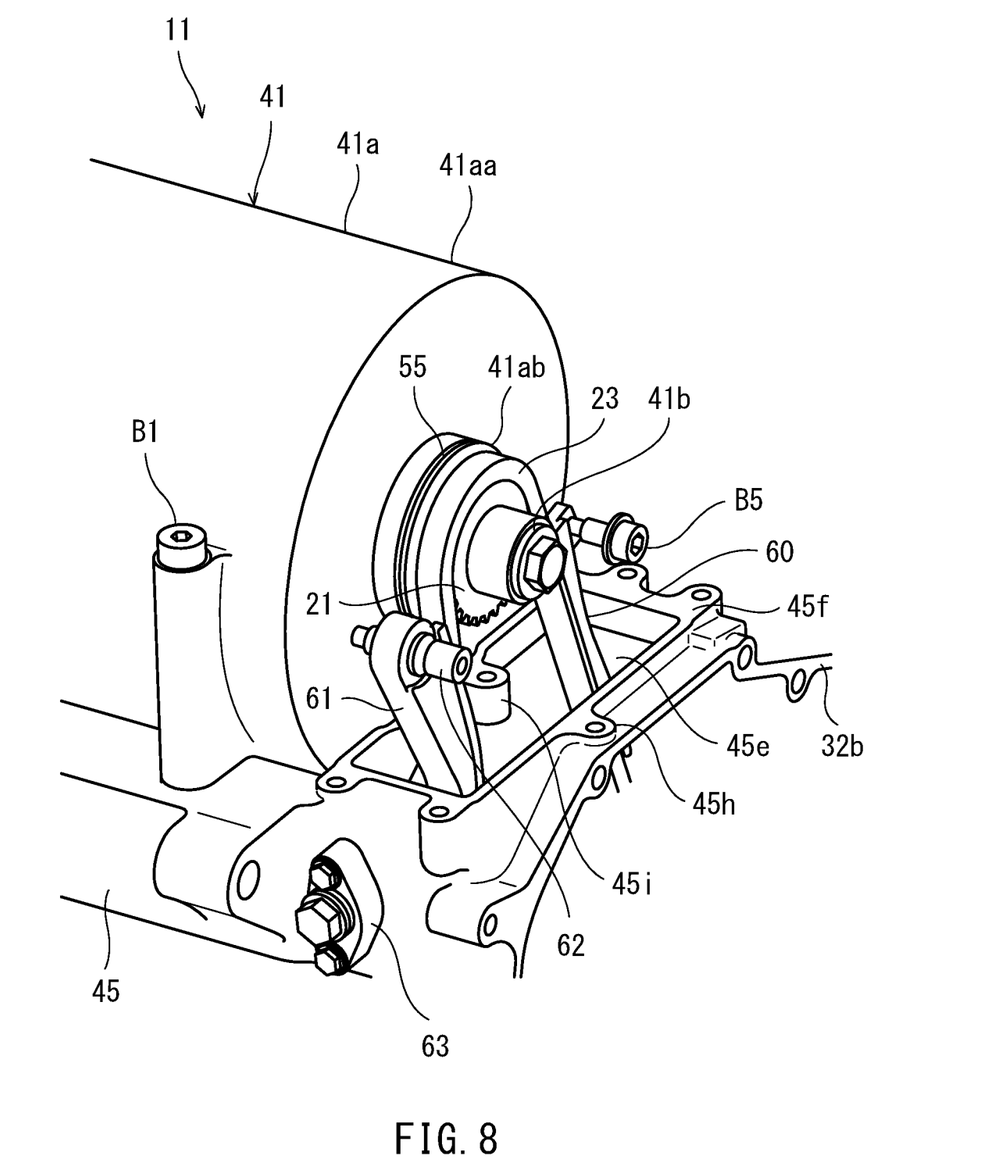
FIG. 8 is a partial perspective view showing that the shaft cover of the hybrid power unit shown in FIG. 3 is detached.

FIG. 6 is a partial sectional view when viewed from a rear side of the hybrid power unit 11 shown in FIG. 3. FIG. 7 is a partial right side view of the hybrid power unit 11 shown in FIG. 3. FIG. 8 is a partial perspective view of the hybrid power unit 11 shown in FIG. 3. In FIGS. 6 and 7, the lid 52 (see FIG. 3) of the shaft cover 30 and the clutch cover 29 (see FIG. 3) are detached, and the main clutch 17 (see FIG. 2) is not shown. In FIG. 8, the shaft cover 30 is detached.

As shown in FIG. 6, the upper case 45 is fastened to the lower case 46 in the upper-lower direction by a fastener B4, such as a bolt. A bearing 57 supporting the input shaft 14a is sandwiched between the upper case 45 and the lower case 46 in the upper-lower direction. The side wall 32a of the crank case 32 includes an insertion hole 32c through which the main chamber MR communicates with the auxiliary chamber SR. The bearing 57 is located at the insertion hole 32c. To be specific, the bearing 57 is sandwiched between the upper case 45 and the lower case 46. The input shaft 14a extends from the main chamber MR through the insertion hole 32c and reaches the clutch space S1. The sprocket 22 is located at the input shaft 14a in the clutch space S1.

As shown in FIGS. 6 and 7, the shaft cover 30 is detachably fixed to an outer surface of the crank case 32 so as to cover the through hole 45e of the crank case 32. The contact surface 51e of the cover main body 51 of the shaft cover 30 is in contact with the contact surface 45f of the upper case 45 of the crank case 32 from the upper side. The fasteners B3 are in the fastening seat portions 51f and 51g of the cover main body 51 and the fastening seat portions 45h and 45i of the upper case 45 in the upper-lower direction to fasten the cover main body 51 to the upper case 45. The fastener B3 is fastened to the fastening seat portion 51f and the fastening seat portion 45h at an outside of the shaft space S2. The fastener B3 is fastened to the fastening seat portion 51g and the fastening seat portion 45i at an inside of the shaft space S2. The through hole H1 of the cover main body 51 communicates with the through hole 45e of the upper case 45.

As shown in FIGS. 6 and 8, the motor housing 41a includes a housing main body 41aa and a fitting tubular portion 41ab. The housing main body 41aa houses a rotor and a stator. The fitting tubular portion 41ab projects from the housing main body 41aa toward the shaft cover 30. The fitting tubular portion 41ab has a cylindrical shape and is open toward the shaft cover 30.

As shown in FIG. 6, the fitting tubular portion 41ab of the motor housing 41a is fitted to the fitted tubular portion 51b of the cover main body 51 of the shaft cover 30. A seal 55 is between an outer peripheral surface of the fitting tubular portion 41ab and an inner peripheral surface of the fitted tubular portion 51b. The motor driving shaft 41b projects from the housing main body 41aa through the fitting tubular portion 41ab to an outside of the motor housing 41a. An annular seal 56 is in a gap between the motor driving shaft 41b and the fitting tubular portion 41ab. The motor driving shaft 41b extends through an internal space of the fitting tubular portion 41ab and the shaft hole H2 of the cover main body 51 and reaches the shaft space S2. The sprocket 21 is located at the motor driving shaft 41b in the shaft space S2.

The through hole H1 of the cover main body 51 communicates with the through hole 45e of the upper case 45. The chain 23 extends through the through holes H1 and 45e and is wound around the sprocket 21 in the shaft space S2 and the sprocket 22 in the clutch space S1. To be specific, the linkage 20 including the sprockets 21 and 22 and the chain 23 is located in the auxiliary chamber SR including the clutch space S1 and the shaft space S2. The linkage 20 transmits the driving power from the motor driving shaft 41b to the input shaft 14a. The chain 23 is one example of a power transmitting loop, and a belt may be used as the power transmitting loop.

The contact surface 45f of the outer surface of the crank case 32 is the attachment surface to which the shaft cover 30 is fixed. The contact surface 45f is located on the upper surface of the crank case 32. Specifically, the contact surface 45f is located at the inner side of the clutch cover 29 in the vehicle width direction and is located at a position adjacent to an end portion of the input shaft 14a of the transmission 14 in a radial direction. For example, the contact surface 45f is located at an outer side of the insertion hole 32c, in which the bearing 57 supporting the input shaft 14a is, in the vehicle width direction. With this, the fastener B4 by which the upper case 45 and the lower case 46 are combined with each other is easily located.

The shaft cover 30 has such a tapered shape that in a back view, a dimension of the shaft cover 30 in the vehicle width direction becomes small as the shaft cover 30 extends upward. Specifically, a contact surface of the cover main body 51 which is covered with the lid 52 is an inclined surface inclined such that the inclined surface approaches the electric motor 41 as it extends upward. More specifically, a wall of the shaft cover 30 which is opposed to the electric motor 41 extends along a plane perpendicular to the motor driving shaft 41b. The lid 52 that is a wall of the shaft cover 30 which is opposite to the wall opposed to the electric motor 41 extends diagonally to a virtual plane orthogonal to the motor driving shaft 41b and is inclined such that the lid 52 approaches the electric motor 41 as it extends upward.

As shown in FIGS. 7 and 8, the hybrid power unit 11 includes the fixed guide 60 and the movable guide 61 which guide the chain 23. The fixed guide 60 and the movable guide 61 are opposed to each other so as to push an outer periphery of the chain 23 toward an inner peripheral side. Specifically, the fixed guide 60 is in contact with the outer periphery of the chain 23 from the front side, and the movable guide 61 is in contact with the outer periphery of the chain 23 from the rear side.

The fixed guide 60 is supported by the crank case 32 and the cover main body 51. An upper end portion of the fixed guide 60 is fixed to the guide support 51c of the cover main body 51 by the fastener B5. The movable guide 61 is supported by the cover main body 51 so as to be swingable. An upper end portion of the movable guide 61 is in connection with the guide support 51d of the cover main body 51 by the support pin 62 so as to be turnable. Since the support pin 62 serves as both a support for the cover main body 51 and a support for the movable guide 61, the number of components can be reduced. The guide supports 51c and 51d are located so as to be exposed through the opening H3 when viewed from an outside in the vehicle width direction in a state where the lid 52 (see FIG. 3) is detached.

To prevent the slack of the chain 23, a tensioner 63 is located at the crank case 32 so as to bias the movable guide 61 toward the chain 23. In the present embodiment, the tensioner 63 is a hydraulic piston that can push the movable guide 61 toward the chain 23. However, the tensioner 63 may be another actuator, such as a solenoid.

The electric motor 41 serves as a drive motor and can also serve as a regenerative motor. In this case, the power is transmitted by the chain 23 from the electric motor 41 to the input shaft 14a or from the input shaft 14a to the electric motor 41. Therefore, the fixed guide 60 and the movable guide 61 may be located at each of the front and rear sides of the chain 23.

Figure 9:
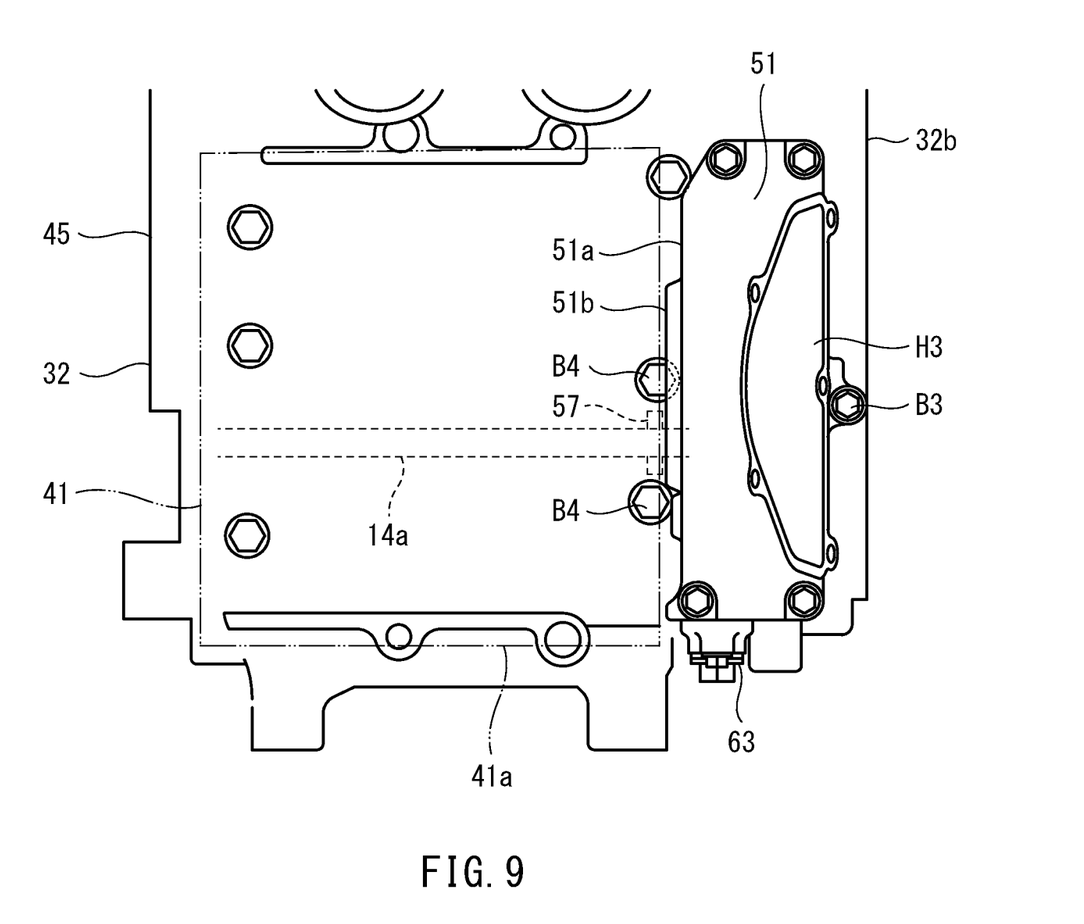
FIG. 9 is a partial plan view showing that an electric motor of the hybrid power unit shown in FIG. 3 is detached.

FIG. 9 is a partial plan view showing that the electric motor 41 of the hybrid power unit 11 shown in FIG. 3 is detached. As shown in FIG. 9, when viewed from the upper side, the fitted tubular portion 51b of the cover main body 51 is a portion projecting from the side wall 51a toward the motor housing 41a. The fitted tubular portion 51b projects toward the motor housing 41a beyond the contact surface 45f when viewed in a direction orthogonal to the contact surface 45f (see FIG. 8).

In a plan view, the pair of fasteners B4 fastened to the crank case 32 from the upper side are located so as to sandwich the bearing 57 supporting the input shaft 14a. The fitted tubular portion 51b of the cover main body 51 overlaps a part of the fastener B4 when viewed in a fastening direction of the fastener B4. The fastening direction of the fastener B4 is, for example, the direction orthogonal to the contact surface 45f (see FIG. 8). When viewed in the fastening direction of the fastener B4, the fitted tubular portion 51b of the cover main body 51 is adjacent to the bearing 57 located between the pair of fasteners B4.

FIG. 10A is a perspective view of a cover main body 151 according to a modified example. FIG. 10B is a rear view of the cover main body 151 shown in FIG. 10A. As shown in FIGS. 10A and 10B, the cover main body 151 has a substantially rectangular solid shape but is basically similar to the cover main body 51. The cover main body 151 defines the shaft space S2 as the internal space. As with the cover main body 51, the cover main body 151 includes the through hole H1, the shaft hole H2, and the opening H3. As with the cover main body 51, the cover main body 151 includes a side wall 151a and a fitted tubular portion 151b projecting outward from the side wall 151a toward the motor housing 41a (see FIG. 6). As with the cover main body 51, the cover main body 151 includes guide supports 151c and 151d.

According to the above configuration, by the shaft cover 30, oil in the crank case 32 is prevented from scattering through the through hole 45e to an outside, and the linkage 20 is prevented from being exposed to an outside. In a state where the shaft cover 30 is detached, the fasteners B4 are fixed to the crank case 32. With this, the fasteners B4 can be fixed to the crank case 32 without the interference between the shaft cover 30 and the fasteners B4. The shaft cover 30 is detachable, and therefore, as compared to a case where the shaft cover 30 is designed in consideration of the interference with the fasteners B4, the shaft cover 30 can be designed without considering the interference with the fastener B4, and the degree of freedom of the design of the shaft cover 30 can be improved. In the case of casting the shaft cover 30, since the shaft cover 30 is separable from the crank case 32, the casting of the shaft cover 30 can be easily performed.

The fastening work of the fasteners B4 is performed before the shaft cover 30 is attached. With this, the shaft cover 30 is prevented from interfering with the fastening work of the fasteners B4. The fitted tubular portion 51b of the shaft cover 30 can project toward the motor housing 41a without deteriorating the assembly workability. Since the fitted tubular portion 51b of the shaft cover 30 does not interfere with the fastening work of the fasteners B4, a projection amount of the fitted tubular portion 51b of the shaft cover 30 can be made large, and the seal performance and the durability can be improved by using the seal 55 that is thick.

The shaft cover 30 includes the guide supports 51c and 51d that support the fixed guide 60 and the movable guide 61 which guide the chain 23. Therefore, the guide supports 51c and 51d can be formed more easily than when the guide supports 51c and 51d are formed at the crank case 32.

The fastening seat portion 51g of the shaft cover 30 does not project from the side wall 51a toward the motor housing 41a but projects from the side wall 51a toward the shaft space S2. Therefore, the motor housing 41a is located close to the shaft cover 30, and this can realize compact layout.

The shaft cover 30 does not have to include the lid 52, and the opening H3 may be omitted from the cover main body 51. The fastener B4 that overlaps the fitted tubular portion 51b when viewed in the fastening direction of the fastener B4 is not limited to a bolt and may be, for example, a nut. The fastener B4 located on the outer surface of the crank case 32 may be located close to the fitted tubular portion 51b without overlapping the fitted tubular portion 51b when viewed in the fastening direction of the fastener B4. In this case, in a state where the shaft cover 30 is detached, the fastening work of the fasteners B4 is performed. With this, a tool used for the fastening work of the fasteners B4 is prevented from interfering with the shaft cover 30.

The fastener B4 fixes the upper case 45 to the lower case 46 but may fix a component, such as a bracket, to the crank case 32. Each of the fastening direction of the fastener B4 and the direction orthogonal to the contact surface 45f is not limited to the upper-lower direction and may be another direction.

A portion of the shaft cover 30 which is adjacent to the fasteners B4 when viewed in the fastening direction of the fastener B4 does not have to be the fitted tubular portion 51b as long as this portion of the shaft cover 30 is a portion projecting from the side wall 51a toward the motor housing 41a. For example, this portion of the shaft cover 30 may be a portion projecting from the side wall 51a for the components (for example, the fastener B5, the support pin 62, and the guide supports 51c and 51d) located in the shaft space S2 of the shaft cover 30.

In the present embodiment, the "power transmitting shaft" to which the power of the crank shaft 33 is transmitted and which is housed in the crank case 32 is the input shaft 14a of the transmission 14. However, the "power transmitting shaft" may be a shaft that is not included in the transmission. The crank case 32 may house the power transmitting shaft located on the power transmitting path between the crank shaft 33 and the rear wheel 3 without housing the transmission. The straddle vehicle including the hybrid power unit 11 does not have to be a two-wheeled vehicle and may be a three-wheeled vehicle. The hybrid power unit 11 does not have to be included in the straddle vehicle and may be included in a four-wheeled vehicle or a device other than the vehicle.

The internal combustion engine 12 can adopt the structure of a known internal combustion engine. The number of cylinders of the internal combustion engine 12 may be any number. The number of cylinders of the internal combustion engine 12 is not limited to two and may be, for example, one or four. The hybrid power unit 11 may be a series hybrid power unit instead of a parallel hybrid power unit.

The linkage 20 connects the motor driving shaft 41b to the input shaft 14a of the transmission 14. However, the linkage 20 is not limited to this. For example, the linkage 20 may connect the motor driving shaft 41b to a rotating body, such as the primary gear 15, located upstream of the main clutch 17. The linkage 20 may connect the motor driving shaft 41b to the output shaft 14b of the transmission 14. In the present embodiment, the crank shaft 33 extends in the vehicle width direction. However, a direction in which the crank shaft 33 extends may be another direction.

The motor driving shaft 41b projects toward only one side of the motor housing 41a but may project toward both sides of the motor housing 41a. In this case, both end portions of the motor driving shaft 41b may be covered with shaft covers.

In addition to or instead of the guide supports 51c and 51d, the shaft cover 30 may include a support that supports another component located in the shaft space S2. For example, the shaft cover 30 may support a tensioner that applies tensile force to the chain 23, may support an injector that injects a lubricating liquid, or may support a sensor located in the shaft space S2.

At least one of the through hole H1 or the through hole 45e may have a region through which the linkage 20 can extend. A gap between a space through which a driving side of the chain 23 extends and a space through which a driven side of the chain 23 extends may be closed.

As described above, the embodiment has been described as an example of the technology disclosed in the present application. However, the technology in the present disclosure is not limited to this and is also applicable to embodiments in which modifications, replacements, additions, omissions, and the like are suitably made. Moreover, a new embodiment may be prepared by combining the components described in the above embodiment. For example, some of components or methods in one embodiment may be applied to another embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A hybrid power unit comprising:
an internal combustion engine including a crank shaft and a crank case that houses the crank shaft and includes a through hole;
a power transmitting shaft to which power from the crank shaft is transmitted and which is housed in the crank case;
an electric motor including a motor housing and a motor driving shaft projecting from the motor housing toward a lateral side, the electric motor being located on an outer surface of the crank case;
a linkage which extends through the through hole and through which power from the motor driving shaft is transmitted to the power transmitting shaft; and
a shaft cover defining a shaft space that houses a portion of the motor driving shaft which projects from the motor housing, the shaft cover being detachably fixed to the outer surface of the crank case so as to cover the through hole.

2. The hybrid power unit according to claim 1, further comprising a fastener fastened to the crank case, wherein a part of the shaft cover is adjacent to the fastener when viewed in a fastening direction of the fastener.

3. The hybrid power unit according to claim 2, wherein:
the shaft cover includes a contact surface that is in contact with the outer surface of the crank case; and
the part of the shaft cover is a portion projecting toward the motor housing beyond the contact surface when viewed in a direction orthogonal to the contact surface.

4. The hybrid power unit according to claim 3, wherein:
the motor housing includes:
a housing main body; and
a fitting tubular portion which projects from the housing main body toward the shaft cover and in which the motor driving shaft is;
the shaft cover includes:
a side wall opposed to the motor housing; and
a fitted tubular portion projecting from the side wall toward the motor housing;
the fitting tubular portion of the motor housing is fitted to the fitted tubular portion of the shaft cover through a seal; and
the part of the shaft cover is the fitted tubular portion.

5. The hybrid power unit according to claim 1, wherein:
the linkage includes a power transmitting loop which extends through the through hole and mechanically connects the motor driving shaft to the power transmitting shaft;
the hybrid power unit further includes a guide which extends through the through hole and guides the power transmitting loop; and
the shaft cover includes a guide support that supports the guide.

6. The hybrid power unit according to claim 1, wherein the shaft cover includes:
a side wall facing the motor housing; and
a fastening seat portion including a fastening hole in which a second fastener is, the fastening seat portion projecting from the side wall toward the shaft space, the shaft cover being fixed to the crank case by the second fastener.

7. A hybrid straddle vehicle comprising a hybrid power unit,
the hybrid power unit comprising:
an internal combustion engine including a crank shaft and a crank case that houses the crank shaft and includes a through hole;
a power transmitting shaft to which power from the crank shaft is transmitted and which is housed in the crank case;
an electric motor including a motor housing and a motor driving shaft projecting from the motor housing toward a lateral side, the electric motor being located on an outer surface of the crank case;
a linkage which extends through the through hole and through which power from the motor driving shaft is transmitted to the power transmitting shaft; and
a shaft cover defining a shaft space that houses a portion of the motor driving shaft which projects from the motor housing, the shaft cover being detachably fixed to the outer surface of the crank case so as to cover the through hole.

8. A case of a hybrid power unit,
the hybrid power unit comprising:
an internal combustion engine including a crank shaft;
a power transmitting shaft to which power from the crank shaft is transmitted; and
an electric motor including a motor housing and a motor driving shaft and located on an outer surface of the internal combustion engine, the case comprising:
- a crank case that houses the crank shaft and the power transmitting shaft and includes a through hole through which a linkage, which transmits power from the motor driving shaft to the power transmitting shaft, extends; and
- a shaft cover defining a shaft space that houses a portion of the motor driving shaft which projects from the motor housing, the shaft cover being detachably fixed to an outer surface of the crank case so as to cover the through hole.

* * * * *